United States Patent [19]
Sanson

[11] 4,089,919
[45] May 16, 1978

[54] METHOD OF RESHAPING RESILIENTLY DEFORMABLE SHEET MATERIAL FOR INTEGRATION WITH A FLEXIBLE PLASTIC FOAM AS A COVER THEREFOR

[75] Inventor: Joseph F. Sanson, Beaugency, France

[73] Assignee: The Upjohn Company, Kalamazoo, Mich.

[21] Appl. No.: 557,247

[22] Filed: Mar. 11, 1975

[30] Foreign Application Priority Data

Mar. 19, 1974 France ............................... 74 09249

[51] Int. Cl.² .................. B29C 1/04; B29D 27/04; B29D 9/00; B29C 17/04
[52] U.S. Cl. .................. 264/46.6; 264/46.8; 264/92; 264/93; 264/259; 264/267; 264/313; 264/314; 264/337; 264/338
[58] Field of Search ............ 264/88, 101, 313, 316, 264/337, 338, 39, 90, 92, 130, 93, 94, 334, 46.8, 46.6, 314, 267; 425/89, 90, 388, 389, DIG. 55, 60

[56] References Cited

U.S. PATENT DOCUMENTS

| | | | |
|---|---|---|---|
| 2,978,376 | 4/1961 | Hulse | 264/90 |
| 3,057,768 | 10/1962 | McGough | 425/389 |
| 3,535,740 | 10/1970 | Frowde | 425/389 |
| 3,566,650 | 3/1971 | Johnson | 425/389 |
| 3,608,055 | 9/1971 | Long | 264/316 |
| 3,895,087 | 7/1975 | Ottinger et al. | 264/46.8 |

OTHER PUBLICATIONS

Painton, The Working Of Aluminum, Chapman & Hall, London, (1927), pp. 146-153.
Reynolds Metals Co., Aluminum Forming, (1958), pp. 42, 43, 48, 49-55.

*Primary Examiner*—Willard E. Hoag
*Attorney, Agent, or Firm*—St. Onge, Mayers, Steward & Reens

[57] ABSTRACT

A method is disclosed of reshaping a sheet of resiliently deformable material impervious to fluid by conforming it to the cavity of a female mold and casting a flexible plastic foam into contact with said sheet material, whereby said material is integrated with the foam and forms a cover sheet therefor. A perforated elastic diaphragm is interposed, during the reshaping and foam casting process, between the cover sheet and surface of the mold cavity so that the cover sheet is in superimposed direct contact with the diaphragm throughout its area. The two are clamped to the periphery of the mold to form a seal thereat, and a differential pressure is applied across the cover sheet and diaphragm. The sheet is therefore deformed against the walls of the mold simultaneously with the diaphragm and is stretched evenly with the diaphragm in order to produce uniform thickness. If the cavity of the mold has a complicated configuration a diaphragm of varying thickness is used in order to ensure uniform stretching of the sheet. In simple molds, the diaphragm can be made to slide against the walls of the mold by using a lubricant which does not come in contact with the sheet being molded. The sheet and diaphragm together stretch uniformly because the diaphragm can slide against the walls of the cavity.

5 Claims, 4 Drawing Figures

METHOD OF RESHAPING RESILIENTLY DEFORMABLE SHEET MATERIAL FOR INTEGRATION WITH A FLEXIBLE PLASTIC FOAM AS A COVER THEREFOR

BACKGROUND OF THE INVENTION

This invention relates to a method of molding a deformable fabric or thermoformable sheet, and in particular to a method of molding under vacuum and/or pressure a cold or hot deformable fluid-impervious fabric or a sheet of thermoformable plastic material in the cavity of a female mold for manufacturing flexible foam cushions of plastic material having an integrated fabric cover, and to a diaphragm for use in carrying out the method.

It is known to manufacture flexible foam cushions of plastic material having an integrated fabric cover by arranging a cold or hot deformable fabric, which has been made airtight (fluid-impervious) by an elastic coating applied to one of its faces, in a female mold, by fixing the cover to the periphery of the mold under vacuum, and by casting into the mold and onto the fabric cover arranged therein a foaming mixture capable of producing in situ a flexible foam of plastic material. After the foam has polymerized, the cushion together with its fabric cover adhering to the foam is removed from the mold.

A major difficulty of this known method is obtaining a uniform stretch and thickness in the fabric cover of the finished article. In fact, upon applying a vacuum to the mold, the fabric is not deformed uniformly as it undergoes stretching, because as the fabric cover contacts the shallower portions of the mold cavity, it is held there by the simultaneous action of vacuum and friction. In order to be able to also take the form of the deeper portions of the mold cavity, the fabric then has to stretch to a greater extent at the places where it is not adhering to the cavity wall. This results in the fabric being stretched unevenly and, therefore, in differences in the thickness of the cover of the finished cushion.

In order to obtain a uniform thickness throughout the cover fabric, it would be necessary for the fabric to be able to slide on the cavity wall in order to be uniformly distributed in the cavity. This is prevented or resisted, however, for the reasons referred to unless use is made of a liquid or powder lubricant capable of allowing the fabric to slide. Use of a lubricant under the conditions encountered is generally not possible without damaging the cover of the finished article.

To overcome this problem, it is possible to use one or more pistons which push the fabric towards the deep portions of the mold before applying the vacuum. Under the action of the pistons, the fabric as a whole then undergoes a first deformation, which is uniform to a greater or lesser extent, in order to give it a shape substantially similar to that of the mold cavity before applying the vacuum. The application of a vacuum then causes auxiliary fabric deformation to a relatively reduced extent against the inner wall throughout the mold.

This process which allows the fabric to be placed in a mold by causing the fabric as a whole to undergo a relatively uniform stretching requires, however, the use of auxiliary equipment which becomes quite complicated and expensive when the mold has a complicated pattern, and the system cannot practically be employed with moving molds such as those used in a cushion production line.

SUMMARY OF THE INVENTION

The present invention provides a method of arranging under vacuum and/or pressure a hot or cold deformable, fluid-impervious fabric in the inner cavity of a female mold having a perforated wall, the said fabric being made fluid-impervious by applying an elastic covering or a sheet of thermoformable plastic material to one of its faces, the fabric or the sheet being sealingly fixed on the periphery of the mold cavity with interposition of an elastic fluid-pervious diaphragm facing the mold cavity, wherein the vacuum established under the diaphragm is applied to the fabric or sheet through the diaphragm. The surface of the diaphragm contacting the sheet is made non-skid or non-sliding to cause temporary adherence of the fabric or sheet to the diaphragm while the latter is being deformed, whereby the fabric or sheet is simultaneously deformed so that it is applied against the mold cavity by being caused to undergo uniform diaphragm-controlled stretching throughout its area.

Thus, according to the method of the invention, a perforated (i.e. fluid-pervious) elastic diaphragm is arranged between the fabric or sheet and the inner wall of the mold, this diaphragm being deformed in a substantially uniform manner under the action of vacuum and/or pressure on the non-pervious sheet in order to take the shape of the inner cavity of the mold, and the fabric or sheet is caused to adhere to the diaphragm while the latter is being deformed, thereby undergoing a substantially uniform stretching.

The method according to the invention permits distribution of the deformable fabric or thermoformable sheet throughout the cavity of the mold such that the fabric or sheet undergoes a substantially uniform stretching throughout its surface. On the other hand, this method does not require expensive auxiliary equipment and can be carried out with moving molds without difficulty.

Where molds are used which have an inner cavity of complicated configuration with significant variations in depth (i.e., non-uniform depth contour), it is possible to use a diaphragm of varying thickness which is deformed under the action of vacuum and/or pressure, preferably starting from its thinner portions which are caused to rest against the shallower portions of the inner cavity of the mold before the diaphragm is deformed at its thicker portions to rest against the deeper portions of the inner cavity of the mold.

The thinner portions of the diaphragm are the first to be deformed and are therefore applied against the shallower portions of the mold first, thereby causing the corresponding parts of the fabric or sheet adhering to the diaphragm to undergo a pre-determined amount of stretching. It is only after the thin portions of the diaphragm are blocked against being stretched further by the simultaneous actions of the vacuum and the friction against the inner wall of the mold that the thick portions of the diaphragm are in turn deformed, causing the corresponding portions of the fabric or sheet to undergo a corresponding pre-determined amount of stretching as it is brought to rest against the deep portions of the inner cavity of the mold.

By suitably choosing a thickness range for the diaphragm which is a function of the depth variations of the inner cavity of the mold, it is possible to impart substantially the same deformation throughout the diaphragm so that the fabric or sheet adhering to the diaphragm and being deformed together with the latter undergoes substantially uniform stretching.

In order to make the fabric or sheet adhere to the diaphragm under the vacuum established in the mold, it is advantageous to make the side of the diaphragm facing the fabric or sheet non-sliding, for example by applying to it a layer of a slide-preventing material such as polyisobutylene. When manufacturing cushions of relatively simple shape it may be sufficient, in order to arrange the fabric cover of these cushions in the mold and to cause the fabric to undergo a substantially uniform stretching, to employ a diaphragm of uniform thickness capable of sliding on the inner cavity of the mold, whereby it is uniformly distributed throughout the inner cavity and is subjected to the same deformation throughout its extension, thereby ensuring uniform stretching of the fabric adhering to the diaphragm.

In order to facilitate this sliding movement, the side of the diaphragm facing the inner cavity of the mold can be lubricated, but since this side of the diaphragm is opposite that in contact with the fabric, this can be done without damaging the fabric. This lubrication can be by means of a solid or liquid lubricant such as a silicone grease, a polytetrafluoroethylene grease or emulsion, or simply talc. As a result of the lubrication of the diaphragm, the sliding of the latter on the inner cavity of the mold is made much easier so that due to its own elasticity the diaphragm can be uniformly distributed throughout the surface of the inner cavity.

An elastic diaphragm of either varying or uniform thickness can be arranged and fixed together with the fabric in a tensioning frame mounted in an airtight manner on the periphery of the mold.

However, the diaphragm can also be fixed in the mold itself rather than a frame, in which case it will assist by its own elasticity the removal of the cushion from the mold at the end of the molding operation, and the fabric may then be located and fixed separately in the tensioning frame mounted in an airtight manner on the periphery of the mold above the diaphragm.

The elastic diaphragm can be formed of any material sufficiently elastic to be able to take the form of the inner cavity of the mold, for example an elastic fabric or a natural or synthetic rubber sheet.

It is preferred to use diaphragms of natural or synthetic molded rubber particularly when the diaphragms are of varying thickness. In fact, it is possible to obtain a large number of identical diaphragms from a single mold, these diaphragms serving, for example, for all the molds designed to be used in a production line of cushions. Furthermore, molding allows diaphragms of any thickness range to be obtained.

When arranging cold deformable fabrics and thermoformable sheets in the mold, the diaphragm should be produced from a heat resistant material used for the deformation of the fabrics or the thermoforming of the sheets.

DETAILED DESCRIPTION OF THE PREFERRED EMBODIMENTS

Figure 1:
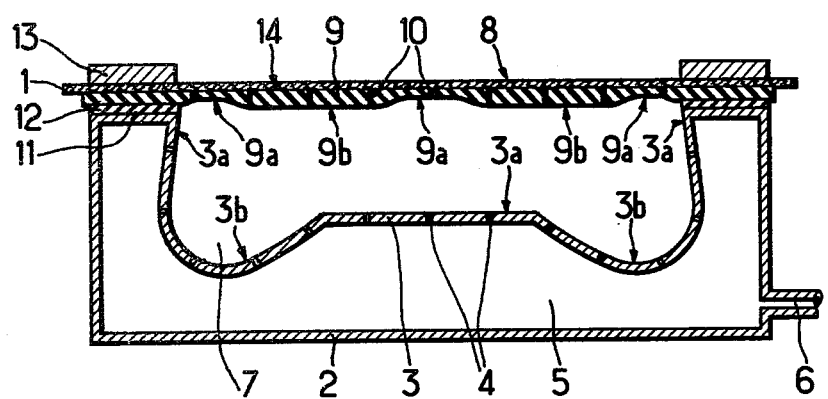
Figure 2:
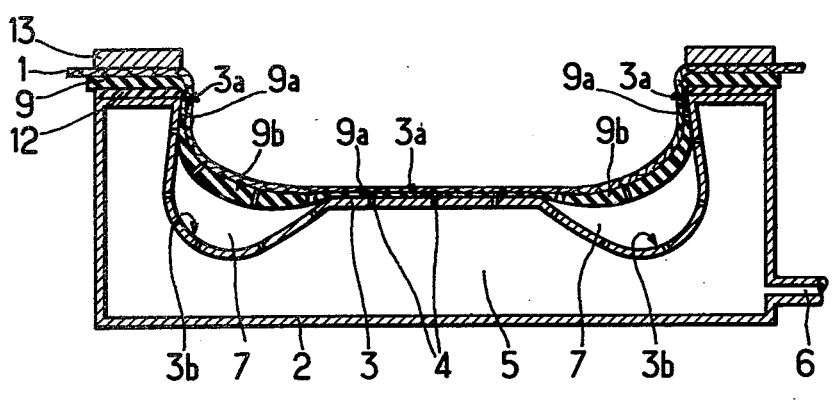
Figure 3:
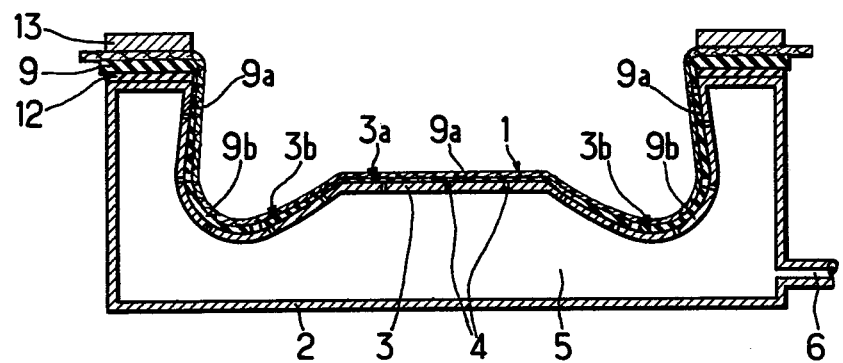
Figure 4:
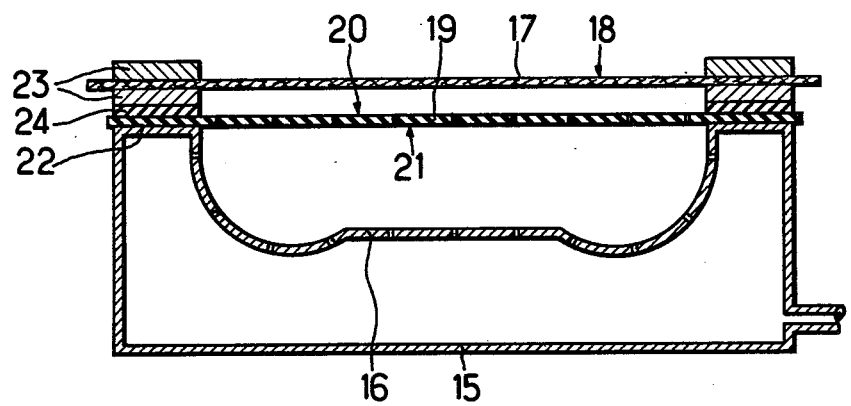

The invention will be further described, by way of example only, with reference to the accompanying drawings, in which:

FIGS. 1 to 3 are vertical sections through a mold and illustrate various steps in the method according to the invention of molding a fabric in a mold by employing a diaphragm of varying thickness; and FIG. 4 is also a vertical section through a mold and illustrates a way of carrying out the method according to the invention by employing a lubricated diaphragm of uniform thickness.

FIG. 1 shows an apparatus for molding in a mold, by means of a vacuum, a fabric 1 which is to form the cover of a flexible foam cushion of plastic material, and for molding the foam cast on the fabric arranged in the mold. This apparatus comprises a female mold 2 having a forming mold surface 3 in the configuration of a cushion. The mold surface 3 is formed with bores 4 so that a vacuum which will be established in a casing 5 of the mold through a duct 6 connected to vacuum producing equipment can be applied through the mold surface 3 to the cavity 7 of the mold. The fabric 1 which is to be located in the mold 2 is made airtight by applying an elastic coating 8 to one of its faces.

The fabric 1 thus prepared is located and fixed, together with an elastic diaphragm 9 formed with holes 10, on the peripheral edge 11 of the mold 2. To this end, the diaphragm 9 and the fabric 1 superimposed on each other are arranged on the edge 11, possibly provided with a seal 12, and are sealingly fixed on the edge 11 by means of a one-piece tensioning frame 13.

The diaphragm 9 is made non-skid or non-sliding throughout its side facing the fabric 1, for example by applying thereto a coating 14 of polyisobutylene, so that the fabric which is applied against the diaphragm 9 under vacuum is caused to adhere to, and cannot be laterally displaced on, the diaphragm during the molding step.

The diaphragm 9 is of varying thickness, i.e. the thickness at its portions 9a designed to take the form of the shallower portions 13a of the mold surface 3 is less than that at the portions 9b designed to take the form of the deepest portions 3b of the mold surface 3.

The thin portions 9a of the diaphragm are easier to deform than the thick portions 9b, and thus the deformation undergone by the diaphragm 9 under the vacuum established within the cavity 7 of the mold first affects its thin portions 9a.

As shown in FIG. 2, the thin portions 9a at the center and the peripheral edge of the diaphragm are deformed by being stretched in order to take the form of the shallower portions 3a of the mold surface 3, while the portions 9b of the diaphragm are not affected by this deformation. The fabric 1 which adheres to the diaphragm 9 follows the deformation of the latter and, therefore, at this point has been stretched only at its portions in contact with the portions 9a of the diaphragm 9.

Once applied against the shallow portions 3a of the mold surface 3, the thin portions 9a of the diaphragm are blocked (i.e. prevented from being stretched further) by the simultaneous actions of vacuum and friction, and the thick portions 9b of the diaphragm 9 are then in turn deformed under vacuum, as shown in FIG. 3, until they take the form of the deep portions 3b of the mold surface 3. This deformation results in stretching of the portions 9b of the diaphragm which causes corresponding stretching in the fabric 1 at its portions adhering to the portions 9b of the diaphragm.

By choosing a suitable thickness range, it is possible to subject the diaphragm 9 to uniform deformation while the diaphragm undergoes deformation in two stages thereby affecting distinct parts of the diaphragm. That is, after complete deformation of the diaphragm, although the diaphragm is thinner as a whole, it still has the same thickness variations as it had before the deformation. The fabric 1 which adheres to the diaphragm 9 under the simultaneous actions of vacuum and friction due to the non-sliding coating 14 thus undergoes the same deformation as the diaphragm 9, and is therefore subjected to substantially uniform stretching. Consequently, when the fabric 1 has taken the form of the mold surface 3, it is the same thickness throughout.

The apparatus shown in FIG. 4 is for molding a fabric in a mold of simpler profile than that shown in FIGS. 1 to 3, i.e. with no great variations in the depth of the cavity. FIG. 4 shows a mold 15 for molding under vacuum having a structure substantially similar to that of the mold 1 shown in FIG. 1, but differs by having a mold surface 16 of less irregular profile. The fabric 17 which has to be arranged in the mold 15 is made airtight by applying an elastic coating 18 to one of its faces.

A perforated diaphragm 19 of uniform thickness is placed between the fabric 17 and the inner wall of the mold surface 16. The diaphragm 19 is made non-sliding on its side facing the fabric 17, for example by applying thereto a coating 20 of polyisobutylene. On its opposite side facing the mold surface 16, diaphragm 19 is lubricated by applying thereto a layer 21 of silicone grease, a polytetrafluoroethylene grease or emulsion, or simply talc.

The diaphragm 19 is sealingly fixed to the peripheral edge 22 of the mold 15 and the fabric 17 is located and fixed between the two parts of a frame 23 which is provided on the diaphragm 19 preferably with interposition of a seal 24.

Under the action of vacuum established in the mold 15, the fabric 17 is first applied against the diaphragm 19 and adheres thereto. The diaphragm is then deformed in the direction of the mold surface 16 and will contact the latter at a pre-determined point depending upon the shape of the cavity. Owing to the lubrication on the side facing the mold surface 16, the diaphragm 19 can slide on the mold surface while it is further deformed so that the diaphragm 19, which has the same thickness throughout its extension and thus the same elasticity, is uniformly distributed on the mold surface 16 by being subjected to the same stretching over its whole area. The fabric 17 which adheres to the diaphragm 19 is then uniformly distributed on the mold surface 16 by being subjected to the same stretching over its whole area. The fabric 17 which adheres to the diaphragm 19 is thus uniformly stretched and after being arranged in the mold has a uniform thickness throughout its extension.

Various modifications may be made to the two embodiments of the invention described above. It is thus possible to differently fix in position or to insert in the mold a diaphragm of uniform thickness or a diaphragm of varying thickness together with the fabric or sheet. In addition, the materials described either in connection with the production of the diaphragm or with a view to rendering the latter non-sliding at one face thereof and possible sliding at the other face thereof have been mentioned only by way of example. Moreover, the diaphragms either of varying thickness or uniform thickness can be used for arranging cold or hot fabrics or sheets of thermoformable plastics material in a mold not only by means of vacuum but also by simultaneously providing vacuum and pressure, the lower face of the mold being free of any auxiliary equipment. For this reason, the molds provided with diaphragms can be integrated without difficulty insofar as they are moving molds in a cushion production line.

What is claimed is:

1. In a method of reshaping a sheet of resiliently deformable material impervious to fluid to define a cover for a flexible plastic foam molded in situ whereby said resilient foam cover is integrated with the foam to produce a pliably resilient product, said covered foam product being of non-uniform depth contour, the improvement which comprises:

providing a female mold having an open face and a cavity of non-uniform depth contour opening onto said face;

disposing a fluid-pervious elastic diaphragm across the open face of said mold cavity;

superimposing said deformable sheet in surface contact with said diaphragm on its exposed face and sealingly fixing said sheet and diaphragm around the periphery of the mold cavity;

creating a pressure differential across said sheet and diaphragm and thereby deforming them resiliently inwardly of said cavity and stretching them concommitantly within the periphery of said mold cavity to form in said deformable sheet a mold-configured cavity of non-uniform depth into which a foam mixture can be cast while said sheet is held in said mold;

restricting sliding of the surface of said diaphragm, facing said cover sheet, relative said cover sheet during said stretching by using for said diaphragm a sheet having an elastomeric surface which resists said sliding; and facilitating sliding of an opposite side of said diaphragm on a surface of said mold during said stretching and causing a portion of said diaphragm to slide on a surface defining said mold cavity at some time during said stretching; thereby stretching said cover sheet uniformly and simultaneously while under positive control of said diaphragm.

2. The method as defined in claim 1, wherein said sheet comprises a resiliently deformable fabric layer and a fluid-impervious elastic covering layer thereon.

3. The method as defined in claim 1, including lubricating the face of the diaphragm in contact with the surface defining the mold cavity.

4. The method as defined in claim 1, which includes coating the surface of the diaphragm in contact with said sheet with polyisobutylene.

5. The method as defined in claim 1, including the step of using a diaphragm whose thickness varies regionally in correspondence with the depth of the mold cavity with which the respective regions of the diaphragm are brought into contact ultimately in the fully deformed condition, said diaphragm thickness being less in regions corresponding to the shallower portions of the cavity and thicker in regions corresponding to the deeper portions of the cavity, thereby causing said diaphragm and said sheet in contact therewith to stretch first in the regions of less diaphragm thickness to bring them into contact with the shallower regions of the mold cavity, and subsequently causing said thicker regions of said diaphragm and associated sheet to stretch to bring these into contact with the deeper regions of the mold cavity.

* * * * *

UNITED STATES PATENT OFFICE
CERTIFICATE OF CORRECTION

Patent No. 4,089,919            Dated May 16, 1978

Inventor(s) Joseph F. Sanson

It is certified that error appears in the above-identified patent and that said Letters Patent are hereby corrected as shown below:

Column 4, line 36:           Should read:

portions 13a               portions 3a

Signed and Sealed this

*Seventh* Day of *November 1978*

[SEAL]

*Attest:*

RUTH C. MASON          DONALD W. BANNER
*Attesting Officer*        *Commissioner of Patents and Trademarks*